US011793208B2

(12) United States Patent
Pisanova et al.

(10) Patent No.: US 11,793,208 B2
(45) Date of Patent: Oct. 24, 2023

(54) ANTIMICROBIAL TREATMENT OF ANIMAL CARCASSES AND FOOD PRODUCTS

(71) Applicant: EVONIK OPERATIONS GMBH, Essen (DE)

(72) Inventors: Elena Pisanova, Amherst, NY (US); Weidong An, Williamsville, NY (US); John M. Rovison, Sanborn, NY (US); Angela Thompson, East Amherst, NY (US)

(73) Assignee: Evonik Operations GmbH, Essen (DE)

( * ) Notice: Subject to any disclaimer, the term of this patent is extended or adjusted under 35 U.S.C. 154(b) by 1098 days.

(21) Appl. No.: 16/009,936

(22) Filed: Jun. 15, 2018

(65) Prior Publication Data

US 2018/0360060 A1 Dec. 20, 2018

Related U.S. Application Data

(60) Provisional application No. 62/519,997, filed on Jun. 15, 2017.

(51) Int. Cl.
| *A01N 37/02* | (2006.01) |
| *A23B 4/12* | (2006.01) |
| *A01N 37/04* | (2006.01) |
| *A01N 59/00* | (2006.01) |
| *A23L 3/3517* | (2006.01) |
| *A23L 3/358* | (2006.01) |
| *A01N 37/16* | (2006.01) |
| *A23B 7/157* | (2006.01) |
| *A23B 4/24* | (2006.01) |
| *A23B 4/20* | (2006.01) |
| *A23B 7/154* | (2006.01) |
| *A23L 3/3508* | (2006.01) |
| *A22C 21/00* | (2006.01) |
| *A22B 5/00* | (2006.01) |

(52) U.S. Cl.
CPC ............... *A23B 4/12* (2013.01); *A01N 37/02* (2013.01); *A01N 37/04* (2013.01); *A01N 37/16* (2013.01); *A01N 59/00* (2013.01); *A22B 5/0082* (2013.01); *A22C 21/0061* (2013.01); *A23B 4/20* (2013.01); *A23B 4/24* (2013.01); *A23B 7/154* (2013.01); *A23B 7/157* (2013.01); *A23L 3/358* (2013.01); *A23L 3/3508* (2013.01); *A23L 3/3517* (2013.01); *A23V 2002/00* (2013.01)

(58) Field of Classification Search
CPC ..... A34L 3/3517; A01N 33/12; A23L 3/3517; A23L 3/358
See application file for complete search history.

(56) References Cited

U.S. PATENT DOCUMENTS

| 4,022,605 A | 5/1977 | Konya et al. |
| 4,915,955 A | 4/1990 | Gomori |
| 5,439,663 A | 8/1995 | Manganaro et al. |
| 5,512,309 A | 4/1996 | Bender et al. |
| 5,632,676 A | 5/1997 | Kurschner et al. |
| 5,849,985 A | 12/1998 | Tieckelmann et al. |
| 5,879,653 A | 3/1999 | Castrantas et al. |
| 5,977,403 A | 11/1999 | Byers |
| 6,365,099 B1 | 4/2002 | Castrantas et al. |
| 6,534,075 B1 * | 3/2003 | Hei ........................ A01N 33/12 134/25.2 |
| 6,828,294 B2 | 12/2004 | Kellar et al. |
| 7,347,647 B2 | 3/2008 | Seech et al. |
| 7,416,718 B2 | 8/2008 | Sethi et al. |
| 7,473,372 B2 | 1/2009 | Block et al. |
| 7,510,721 B2 | 3/2009 | Roden et al. |
| 7,524,141 B2 | 4/2009 | Sethi et al. |
| 7,547,430 B2 | 6/2009 | Sethi et al. |
| 7,576,254 B2 | 8/2009 | Block et al. |
| 7,666,315 B2 | 2/2010 | Lopez Martinez et al. |
| 7,785,038 B2 | 8/2010 | Block et al. |
| 7,947,745 B1 | 5/2011 | Laramay et al. |
| 7,998,446 B2 | 8/2011 | Pfeffer et al. |
| 8,029,693 B2 | 10/2011 | Dada et al. |
| 8,424,493 B2 | 4/2013 | Hilgren et al. |
| 8,454,890 B2 | 6/2013 | Rovison, Jr. et al. |
| 8,486,366 B2 | 7/2013 | Pfeffer et al. |
| 8,575,075 B2 | 11/2013 | Huang et al. |
| 8,865,066 B2 | 10/2014 | Rovison et al. |
| 8,877,149 B2 | 11/2014 | Pfeffer et al. |
| 9,005,669 B2 | 4/2015 | Allen et al. |
| 9,018,142 B2 | 4/2015 | Rovison, Jr. et al. |

(Continued)

FOREIGN PATENT DOCUMENTS

| CA | 2 944 237 | 11/2015 |
| EP | 0 411 970 | 2/1991 |

(Continued)

OTHER PUBLICATIONS

Walter et al., "Efficacy of sodium hypochlorite and peracetic acid in sanitizing green coconuts", Letters in Applied Microbiology, 49, (2009), pp. 366-371. (Year: 2009).*

(Continued)

*Primary Examiner* — Elizabeth Gwartney

(74) *Attorney, Agent, or Firm* — Grüneberg and Myers, PLLC

(57) ABSTRACT

Provided herein are methods and compositions for the reduction of microbial contamination of animal carcasses, including fowl, and food products with carbonic acid-based compositions.

26 Claims, No Drawings

(56) References Cited

U.S. PATENT DOCUMENTS

| | | | |
|---|---|---|---|
| 9,114,357 | B2 | 8/2015 | Block et al. |
| 9,242,879 | B2 | 1/2016 | Keasler et al. |
| 9,254,400 | B2 | 2/2016 | Hilgren et al. |
| 9,295,744 | B2 | 3/2016 | Rovison et al. |
| 9,351,488 | B2 | 5/2016 | Rovison et al. |
| 9,375,768 | B2 | 6/2016 | Pisanova et al. |
| 9,656,890 | B2 | 5/2017 | Block |
| 9,821,353 | B2 | 11/2017 | Pisanova et al. |
| 9,849,203 | B2 | 12/2017 | Rovison, Jr. et al. |
| 9,986,737 | B2 | 6/2018 | Rovison et al. |
| 10,344,199 | B2 | 7/2019 | Pisanova et al. |
| 10,625,655 | B2 | 4/2020 | Rovison, Jr. et al. |
| 2002/0110602 | A1* | 8/2002 | Sorenson ............... C11D 3/10 424/666 |
| 2008/0226541 | A1 | 9/2008 | Zhou et al. |
| 2010/0196503 | A1 | 8/2010 | Heisig et al. |
| 2012/0189494 | A1 | 7/2012 | Rovison, Jr. et al. |
| 2014/0134047 | A1 | 5/2014 | Herdt et al. |
| 2014/0228328 | A1 | 8/2014 | Rovison et al. |
| 2015/0005379 | A1 | 1/2015 | Block et al. |
| 2015/0141301 | A1 | 5/2015 | Rovison, Jr. et al. |
| 2015/0208648 | A1 | 7/2015 | Iwashita et al. |
| 2015/0218437 | A1 | 8/2015 | Rovison, Jr. et al. |
| 2015/0239738 | A1 | 8/2015 | Zhou et al. |
| 2015/0258589 | A1 | 9/2015 | Seech |
| 2015/0305342 | A1 | 10/2015 | Burke et al. |
| 2016/0183522 | A1 | 6/2016 | Rovison et al. |
| 2016/0345576 | A1 | 12/2016 | Rovison et al. |
| 2017/0313604 | A1 | 11/2017 | Garibi et al. |
| 2018/0065874 | A1 | 3/2018 | Au et al. |
| 2018/0103638 | A1 | 4/2018 | Puente de Vera et al. |
| 2018/0117198 | A1 | 5/2018 | Rovison, Jr. et al. |
| 2018/0271090 | A1 | 9/2018 | Rovison et al. |
| 2019/0144313 | A1 | 5/2019 | Block et al. |
| 2019/0152817 | A1 | 5/2019 | Block et al. |
| 2019/0248679 | A1 | 8/2019 | Rovison et al. |
| 2019/0364892 | A1 | 12/2019 | An et al. |
| 2019/0380337 | A1 | 12/2019 | Mittiga et al. |
| 2019/0388574 | A1 | 12/2019 | An et al. |
| 2020/0238887 | A1 | 7/2020 | Rovison, Jr. et al. |
| 2020/0352165 | A1 | 11/2020 | Puente de Vera et al. |

FOREIGN PATENT DOCUMENTS

| | | |
|---|---|---|
| JP | 2009-292817 | 12/2009 |
| JP | 2012-219053 | 11/2012 |
| JP | 2014-014801 | 1/2014 |
| JP | 2015-187084 | 10/2015 |
| WO | WO 01/70030 | 9/2001 |
| WO | WO 2017/100284 | 6/2017 |

OTHER PUBLICATIONS

Abadias et al., "Evaluation of alternative sanitizers to chlorine disinfection for reducing foodborne pathogens in fresh-cut apple", Postharvest Biology and Technology, 59, (2011) pp. 289-297. (Year: 2011).*

Usall et al., "Preventive and curative activity of combined treatment of sodium carbonates and Pantoea agglomerans CPA-2 to control postharvest green mold of citrus fruit", Postharvest Biology and Technology, 50, (2008), p. 1-7. (Year: 2008).*

Feliziani et al., "Disinfecting agents for controlling fruit and vegetable diseases after harvest", Postharvest Biology and Technology, 122, (2016), pp. 53-69. (Year: 2016).*

Thi et al., "Decontamination of Pangasius fish (Pangasius hypophthalmus) with chlorine or peracetic acid in the laboratory and in a Vietnamese processing company", International Journal of Food Microbiology, 208, (2015, pp. 93-101. (Year: 2015).*

Bauermeister et al., "The Microbial and Quality Properties of Poultry Carcasses Treated with Peracetic Acid as an Antimicrobial Treatment", Poultry Science, 87, (2008), pp. 2390-2398. (Year: 2008).*

NOSB TAP Materials Database, "Peracetic Acid Processing", NOSB Tap Materials Database compiled by OMRI, Nov. 3, 2000, https://www.ams.usda.gov/sites/default/files/media/Peracetic%20Acid%20Technical%20Report%20Handling.pdf, downloaded Apr. 7, 2023. (Year: 2000).*

Bell et al., "Reduction of foodborne micro-organisms on beef carcass tissue using acetic acid, sodium bicarbonate, and hydrogen peroxide spray washing", Food Microbiology, 14, (1997), pp. 439-448. (Year: 1997).*

Gill et al., "Effects of peroxyacetic acid, acidified sodium chlorite or lactic acid", International Journal of Food Microbiology, 91, (2004), pp. 43-50. (Year: 2004).*

Bell, K. Y. et al., "Reduction of foodborne micro-organisms on beef carcass tissue using acetic acid, sodium bicarbonate, and hydrogen peroxide spray washes", Food Microbiology, 1997, vol. 14, pp. 439-448.

Sen, A. R. et al., "Effect of chilling, polyphosphate and bicarbonate on quality characteristics of broiler breast meat", British Poultry Science, 2005, vol. 46, No. 4, pp. 451-456.

International Search Report and Written Opinion dated Feb. 1, 2019 for corresponding PCT Application No. PCT/US18/37805.

International Preliminary Report on Patentability for corresponding PCT application PCT/US2018/037805 filed Jun. 15, 2018.

International Search Report for PCT/US2019/034923 filed May 31, 2019, which corresponds to copending U.S. Appl. No. 16/428,216.

Written Opinion of the International Searching Authority for PCT/US2019/034923 filed May 31, 2019, which corresponds to copending U.S. Appl. No. 16/428,216.

International Preliminary Report on Patentabilityfor PCT/US2019/034923 filed May 31, 2019, which corresponds to copending U.S. Appl. No. 16/428,216.

International Search Report for PCT/US2019/038457 filed Jun. 21, 2019, which corresponds to copending U.S. Appl. No. 16/448,542.

Written Opinion of the International Searching Authority PCT/US2019/038457 filed Jun. 21, 2019, which corresponds to copending U.S. Appl. No. 16/448,542.

International Preliminary Report on Patentability for PCT/US2019/038457 filed Jun. 21, 2019, which corresponds to copending U.S. Appl. No. 16/448,542.

Lee, et al., "Development of Environmental-friendly Cleaning Agents Utilizing Organic Acids for Removal of Scale on the Wall of Cleaning Beds and Distribution Reservoirs in the Waterworks," *Clean Technology* 18(3):272-279 (Sep. 2012).

Leggett, et al., "Mechanism of Sporicidal Activity for the Synergistic Combination of peracefebruary 2016).tic acid and hydrogen peroxide," *Applied and Environmental Microbiology* 82(4):1035-1039.

U.S. Appl. No. 16/191,757, filed Nov. 15, 2018, US-2019/0144313 A1, May 16, 2019, Block.

U.S. Appl. No. 16/194,559, filed Nov. 19, 2018, US-2019-0152817 A1, May 23, 2019, Block.

U.S. Appl. No. 16/275,894, filed Feb. 14, 2019, US-2019-0248679 A1, Aug. 15, 2019, Rovison.

U.S. Appl. No. 16/428,216, filed May 31, 2019, US-2019-0364892 A1, Dec. 5, 2019, An.

U.S. Appl. No. 16/448,542, filed Jun. 21, 2019, US-2019-0388574 A1, Dec. 26, 2019, An.

U.S. Appl. No. 16/777,057, filed Jan. 30, 2020, US-2020-0238887 A1, Jul. 30, 2020, Rovison.

U.S. Appl. No. 16/936,663, filed Jul. 23, 2020, US-2020-0352165 A1, Nov. 12, 2020, Puente de Vera.

U.S. Appl. No. 17/253,953, filed Dec. 18, 2020, Mittiga.

\* cited by examiner

ANTIMICROBIAL TREATMENT OF ANIMAL CARCASSES AND FOOD PRODUCTS

CROSS-REFERENCE TO RELATED APPLICATIONS

This application claims priority under 35 U.S.C. § 119(e)(1) from U.S. Provisional Application Ser. No. 62/519,997, filed Jun. 15, 2017, the contents of which are incorporated herein by reference.

FIELD OF THE INVENTION

The present invention relates to methods and compositions for antimicrobial treatment of meat and other food products. The methods and compositions can enhance the organoleptic properties and the water holding capacity of the treated meat.

BACKGROUND OF THE INVENTION

Animal carcasses are typically contaminated with microbes. Such microbial contamination can occur if the animals are naturally infected or during the processing of the carcasses due to contact with fecal matter from the intestine. Contamination of meats and poultry with pathogens, for example, *Escherichia coli, Salmonella* species, or *Campylobacter* species, during processing can result in significant public health risks. Processing methods include multiple steps aimed at ensuring food safety, such as washing, disinfecting, and chilling. Standard methods of disinfection typically involve agents such as chlorinated compounds, trisodium phosphate, or ozone. Such agents may also pose health or environmental risks. Chlorination of food processing water with hypochlorite has raised concern over production of potentially toxic or carcinogenic organochlorine compounds and other byproducts. The excessive use of phosphorus compounds can have a negative impact on water quality. Organic acids have antimicrobial activity in food treatment. But, aqueous solutions of organic acids reduce the pH of the chiller water. Exposure of meat products to a low pH can reduce the water holding capacity of meat products, resulting in a decrease in the final weight and the quality of the meat. In addition, some antimicrobial agents can adversely affect the texture, color, and taste of the meat by producing discoloring, bleaching, or bloating of meat, particularly poultry tissue. There is a continuing need for methods of antimicrobial treatment of meat products that are effective, safe for the consumer and the environment, and that do not adversely affect the quality of the meat.

SUMMARY OF THE INVENTION

Provided herein are methods and compositions for reducing microbial contamination of an animal carcass or food product. The method can include the steps of contacting the animal carcass or food product with a composition comprising a carbonic acid salt, and an organic acid or a salt thereof, and an oxidizing agent, wherein the composition has a pH of above 6.5, for a time sufficient to reduce the microbial contamination. In some embodiments, the carbonic acid salt can be sodium carbonate, sodium bicarbonate, sodium percarbonate, sodium peroxocarbonate, sodium peroxodicarbonate, potassium carbonate, potassium bicarbonate, potassium percarbonate, potassium peroxocarbonate, or potassium peroxodicarbonate. In some embodiments, the organic acid or salt thereof can be lactic acid, benzoic acid, acetic acid, salicylic acid, glycolic acid, citric acid, oxalic acid, propionic acid, formic acid, sorbic acid, malic, maleic, tartaric, ascorbic, or fumaric acid. In some embodiments, the oxidizing agent can be hydrogen peroxide, peracetic acid, calcium peroxide, a soluble metal percabonate, carbamide peroxide, or a peroxy acid of lactic acid, benzoic acid, acetic acid, salicylic acid, glycolic acid, citric acid, oxalic acid, propionic acid, formic acid, sorbic acid, malic, maleic, tartaric, ascorbic, and fumaric acid. Also provided are methods of enhancing the organoleptic properties of meat or poultry. The method can include the steps of contacting a meat or poultry portion with a composition comprising a carbonic acid salt, and an organic acid or a salt thereof, and an oxidizing agent, wherein the composition has a pH of above 6.5, for a time sufficient to increase the water holding capacity of the meat or poultry.

DETAILED DESCRIPTION OF THE PREFERRED EMBODIMENT

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing FIGURE under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for performing the recited function, including not only structural equivalents but also equivalent structures.

The present invention is directed to methods and compositions for reducing microbial contamination of animal carcasses and food products. The inventors have found that a composition comprising a carbonic acid salt, an organic acid and an oxidizing agent, effectively reduced microbial contamination and enhanced the water holding capacity and organoleptic properties of meat that had been treated with the composition. Moreover, the inventors found that the composition maintained a pH in a moderate basic range (pH 7-9) during the chilling time, preserved the antimicrobial activity of the organic acid, and did not induce destruction of the oxidizing agent. The controlled pH of the compositions thus eliminated the need for constant pH adjustment of the chilling solution in order to maintain the antimicrobial activity of the organic acid.

The methods disclosed herein are generally useful for the treatment of an animal carcass or a food product, for example poultry and meat products, in order to reduce contamination of the meat that occurs during processing. The inventors have found that surprisingly, the combination of a carbonic acid salt, an organic acid, and an oxidizing agent generated a buffering medium that facilitated the aseptic treatment of the poultry in a chiller and at the same time enhanced the organoleptic properties of meat and provided an increase in water holding capacity of the meat.

Although not bound to any particular theory, we believe that an increase in water holding capacity of meat and poultry following treatment with carbonic acid salts is caused by diffusion of carbonate/bicarbonate ions into the space between the meat muscle tissue microfibrills. This is based on the equilibrium of $H_2CO_3$ in water:

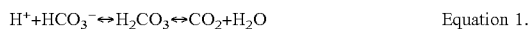

$$H^+ + HCO_3^- \leftrightarrow H_2CO_3 \leftrightarrow CO_2 + H_2O \qquad \text{Equation 1.}$$

As shown in Equation 1, bicarbonate ion can react with hydrogen ions to form a non-dissociated molecule of carbonic acid that can in turn decompose to form $CO_2$ gas.

Animal muscle typically has a low pH and this pH can decline further during standard antimicrobial treatments used in food processing. The reaction shown in Equation 1 can increase the water holding capacity of meat in two potential ways. The first potential mechanism is by an increase in the meat pH due to the pH gradient on the interface between the low pH environment inside the meat and the higher pH of the treatment solution. The diffusion of negatively charged carbonate anions to the inside of the meat will result in ionization of meat proteins with a concomitant increase in water holding capacity. The second potential mechanism may be a change in the structure of meat caused by formation of microbubbles of carbon dioxide ($CO_2$). The carbonate or bicarbonate anion can diffuse into the interfibrillar space of the meat, where it is subjected to a lower pH. At a pH below 6.5, carbonate and bicarbonate ions convert to carbonic acid that in turn decomposes to form carbon dioxide gas (See Equation 1). The $CO_2$ microbubbles can further separate the protein fibrils from one another and thus increase the amount of water within the inter-fibrillar space. Taken together, these mechanisms suggest that the methods and compositions disclosed herein may reduce the rate of pH decline that can accompany standard antimicrobial treatments as well as enhance the water holding capacity of the meat.

The compositions disclosed herein include a carbonic acid salt. The carbonic acid salt can be sodium carbonate, sodium bicarbonate, sodium percarbonate, sodium peroxocarbonate, sodium peroxodicarbonate, potassium carbonate, potassium bicarbonate, potassium percarbonate, potassium peroxocarbonate, or potassium peroxodicarbonate. In some embodiments, the compositions can include a combination of two or more carbonic acid salts, for example, any combination of sodium carbonate, sodium bicarbonate, sodium percarbonate, sodium peroxocarbonate, sodium peroxodicarbonate, potassium carbonate, potassium bicarbonate, potassium percarbonate, potassium peroxocarbonate, or potassium peroxodicarbonate and carbonate salts of ammonium, lithium, or salts of other M+ metals. We may also refer to a carbonic acid salt as an alkaline modifier. The concentration of the carbonic acid salt can vary. The concentration of the carbonic acid salt can range from about 10 ppm to about 1000 ppm. Thus the carbonic acid salt concentration can be about 10 ppm, about 20 ppm, about 40 ppm, about 50 ppm, about 60 ppm, about 80 ppm, about 100 ppm, about 120 ppm, about 125 ppm, about 150 ppm, about 175 ppm, about 200 ppm, about 225 ppm, about 250 ppm, about 275 ppm, about 300 ppm, about 400 ppm, about 500 ppm, about 600 ppm, about 700 ppm, about 800 ppm, about 900 ppm, about 1000 ppm, about 1500 ppm, about 2000 ppm, about 2500 ppm, about 3000 ppm, about 3500 ppm, about 4000 ppm, about 4500 ppm, about 5000 ppm, about 5500 ppm, about 6000 ppm, about 7000 ppm, about 8000 ppm, about 9000 ppm, about 10,000 ppm, about 15,000 ppm, about 20,000 ppm, or about 25,000 ppm. Regardless of the concentration, the carbonic acid salt can be added to the organic acid in an amount sufficient to raise the pH to about 6.0 to about 10.0. In some embodiments, the carbonic acid salt can be added to the organic acid in an amount sufficient to raise the pH to about 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.8, 8.9, 9.0, 9.1, 9.2, 9.3, 9.4, 9.5, 9.6, 9.7, 9.8, 9.9, or 10.

The compositions disclosed herein also include an organic acid or salt thereof. The organic acid or salt thereof can be, for example, lactic acid, benzoic acid, acetic acid, salicylic acid, glycolic acid, citric acid, oxalic acid, propionic acid, formic acid, sorbic acid, malic, maleic, tartaric, ascorbic, or fumaric acid. The concentration of the organic acid or salt thereof can vary. The concentration of the organic acid or salt thereof can range from about 1 ppm to about 100,000 ppm. Thus the concentration of the organic acid or salt thereof can be about 1 ppm, about 2 ppm, about 3 ppm, about 4 ppm, about 5 ppm, about 6 ppm, about 7 ppm, about 8 ppm, about 9 ppm, about 10 ppm, about 11 ppm, about 12 ppm, about 15 ppm, about 18 ppm, about 20 ppm, about 25 ppm, about 30 ppm, about 35 ppm, about 40 ppm, about 45 ppm, about 50 ppm, about 60 ppm, about 70 ppm, about 80 ppm, about 90 ppm, about 100 ppm, about 150 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, about 1000 ppm, about 1500 ppm, about 2000 ppm, about 2500 ppm, about 3000 ppm, about 3500 ppm, about 4000 ppm, about 5000 ppm, about 10,000 ppm, about 20,000 ppm, about 30,000 ppm, about 50,000 ppm, about 100,000 ppm.

The compositions disclosed herein can include an oxidizing agent. The oxidizing agent can be, for example, peracetic acid, hydrogen peroxide, calcium peroxide, a soluble metal percarbonate, carbamide peroxide, or a peroxy acid of lactic acid, benzoic acid, acetic acid, salicylic acid, glycolic acid, citric acid, oxalic acid, propionic acid, formic acid, sorbic acid, malic, maleic, tartaric, ascorbic, and fumaric acid. Peracetic acid is typically used in the form of an aqueous equilibrium mixture of peracetic acid, hydrogen peroxide and acetic acid. The weight ratios of these components may vary greatly, depending upon the particular grade of peracetic acid employed. Exemplary grades of peracetic have weight ratios of peracetic acid:hydrogen peroxide:acetic acid of from 12-18:21-24:5-20; 15:10:36; 5:23:10; 22:10:35 and 35:6.5:15. Peracetic acid solutions are often identified by the concentration of peracetic acid and hydrogen peroxide. For example, a 15/23 formulation contains 15% by weight of peracetic acid and 23% by weight hydrogen peroxide. Commercially available peracetic acid solutions have typical formulations containing 2-35% peracetic acid and 5-30% hydrogen peroxide, with the remainder being acetic acid and water. Exemplary grades of peracetic acid include those having a weight ratio of peracetic acid:hydrogen peroxide between 1:0.01 to 1:14 and a weight ratio of peracetic acid:acetic acid between 1:0.2 to 1:19. More specifically, exemplary peracetic acid solutions can include 5% peracetic acid with 22% hydrogen peroxide and 10.5% acetic acid; 15% peracetic acid with 10% hydrogen peroxide and 35% acetic acid; 15% peracetic acid with 23% hydrogen peroxide and 16% acetic acid; 22% peracetic acid with 10% hydrogen peroxide and 35% acetic acid; and 35% peracetic acid with 6.5% hydrogen peroxide and 40% acetic acid. The concentration of the peracetic acid in the compositions can range from about 1 ppm to about 10,000 ppm. Thus the concentration of the peracetic acid can be about 1 ppm, about 2 ppm, about 3 ppm, about 4 ppm, about 5 ppm, about 6 ppm, about 7 ppm, about 8 ppm, about 9 ppm, about 10 ppm, about 12 ppm, about 15 ppm, about 18 ppm, about 20 ppm, about 25 ppm, about 30 ppm, about 35 ppm, about 40 ppm, about 45 ppm, about 50 ppm, about 60 ppm, about 75 ppm, about 100 ppm, about 125 ppm, about 150 ppm, about 200 ppm, about 250 ppm, about 300 ppm, about 350 ppm, about 400 ppm, about 450 ppm, about 500 ppm, about 1000 ppm, about 1500 ppm, about 2000 ppm, about 2500 ppm, about 3000 ppm, about 3500 ppm, about 4000 ppm, about 4500 ppm, about 5000 ppm, about 7500 ppm, or about 10,000 ppm.

Peroxides can be obtained as aqueous stock solutions and diluted for use. Aqueous hydrogen peroxide stock solutions can contain at least about 8 wt % $H_2O_2$, at least about 15 wt % $H_2O_2$, at least about 20 wt % $H_2O_2$, at least about 27% $H_2O_2$, at least about 35 wt % $H_2O_2$. Aqueous hydrogen peroxide stock solutions with these concentrations, suitable for use in the invention, are readily available from commercial suppliers as stabilized $H_2O_2$ solutions. Highly concentrated aqueous hydrogen peroxide stock solutions (significantly above 50 wt % $H_2O_2$) can also be used. Aqueous $H_2O_2$ stock solutions above about 50 wt % $H_2O_2$ generally require stringent handling and safety measures. Thus, the aqueous hydrogen peroxide stock solutions can have a concentration in the range of about 8 wt % $H_2O_2$ to about 70 wt $H_2O_2$, about 15 wt % $H_2O_2$ to about 50 wt % $H_2O_2$, about 25 wt % $H_2O_2$ to about 40 wt % $H_2O_2$. Useful stock solutions can have a concentration in the range about 30 wt $H_2O_2$ to about 40 wt % $H_2O_2$.

In some embodiments, a peroxide can be a bonded hydrogen peroxide, for example, urea-peroxide $[(NH_2)_2CO \cdot H_2O_2]$. Urea peroxide, also known as carbamide peroxide, is solid adduct of one mole of hydrogen peroxide with one mole of urea. Urea peroxide is a water-soluble crystalline compound that acts as a source of peroxide.

In some embodiments, the composition can include adjuvants such as stabilizers. Typically such adjuvants will be those granted "Generally Regarded as Safe" (GRAS) status by the Food and Drug Administration and are thus exempted from the standard Federal Food, Drug, and Cosmetic Act (FFDCA) food additive tolerance requirements. Exemplary stabilizers include phosphonates (Dequest© 2010) or dipicolinic acid (FCN #1426 US FDA).

In some embodiments, the compositions can include 60-80 ppm of sodium carbonate and 10 ppm of a peracetic acid solution having a weight ratio of 15:10:36 of peracetic acid:hydrogen peroxide:acetic acid. In some embodiments, the compositions can include 800-1000 ppm of sodium bicarbonate and 60 ppm of peracetic acid.

Typical poultry processing involves the steps of stunning the poultry, generally electronically, slaughtering, bleed out, scalding, followed by mechanical removal of the feathers (defeathering), eviscerating, then cleaning and chilling the poultry by immersion of the poultry in a series of chiller tanks containing aqueous solutions. The compositions disclosed herein are generally and variously useful for treatment of animal carcasses or meat products in such chiller tanks. The compositions can be formulated in a variety of ways. In one embodiment, the carbonic acid salt and the organic acid and the oxidizing agent can be combined prior to use to form a concentrated aqueous solution. The concentrated aqueous solution can then be added to the water of the chiller tank to arrive at a final concentration suitable for disinfection. In some embodiments, a concentrated organic acid can be added directly to the chiller tank. A suitable volume of carbonic acid salt and optionally, the oxidizing agent, can then be added to the chiller water, thus forming the composition in situ. In some embodiments, the individual components can be dosed into a common pipeline that then feeds into the chiller water. The concentrations of the individual components can be metered on a weight per unit time basis to maintain the proportionality of the components.

Alternatively, or in addition, the compositions can be applied to the meat by dipping or spraying. In some embodiments, the compositions can be applied to meet by dipping or spraying during on-line reprocessing or off-line reprocessing, for example, for processing of offal such as organ meats or poultry paws.

The temperature of the chiller tank will generally conform to the requirements set forth by the U.S. Department of Agriculture, Food Safety and Inspection Service and other regulatory agencies for safe handling of poultry carcasses. In general, carcasses are chilled in two or more sequential chilling steps at decreasing temperatures to reduce the internal temperature to below 4° C.

The treatment time can vary, but will typically be consistent with the length of time needed to reduce the internal temperature of the poultry carcasses to below 4° C. Exemplary treatment times can be about 15 minutes, about 30 minutes, about 45 minutes, about 60 minutes, about 120 minutes, about 150 minutes, about 180 minutes, or about 360 minutes.

The compositions disclosed herein are generally useful for enhancing the organoleptic properties of a food product, for example, of meat or poultry. Organoleptic properties of food products are generally those that are experienced by the consumer through sight, smell, taste, touch, and in some instances, sound. Such properties can include visual features such as color, size, shape, texture, glossiness; odor or aroma; taste, such as sweet, sour, pungent, bitter, salty, astringent; texture, such as the feeling of the food product when touched by the fingers or in the mouth; auditory aspects, such sizzling of the food during preparation or crunching of the food during consumption. In the case of poultry products, for example, organoleptic properties can include flavor, tenderness, juiciness, and texture.

In some embodiments, the compositions and methods disclosed herein can increase the water holding capacity of the meat or poultry. The water holding capacity, that is, the ability of the meat to retain its inherent moisture, can also be referred to as drip loss or purge. Many factors can affect the water holding capacity of meat, including the handling and processing steps, the rate of temperature decline after harvest, the temperature during storage, the metabolic state of the live animal at the time of harvest, and the genetic makeup of the animal.

The compositions can be used to treat animal carcass, poultry, meat, and seafood products. Exemplary poultry can include any bird or fowl used for human or animal consumption or egg production, including, but not limited to, chicken, duck, turkey, goose, ostrich, pheasant, quail, and squabs. Exemplary meat can include meat from any animal used for human or animal consumption, including beef, pork, veal, and buffalo. Exemplary seafoods can include fish and shellfish. The method is useful for treatment of animal carcasses, poultry, meat, and seafood products obtained from domesticated or farmed animals or from products harvested from wild animals. The compositions can also be used to treat offal, for example, cheeks and head, liver, skin, thymus and pancreas (sweetbreads), kidney, heart, lung, intestine, stomach (tripe), gizzards, testes, brain, tongue, bone marrow, tail, feet, for example, poultry feet, and poultry paws and pig's trotters. We may also refer to offal I as organ meat.

The compositions can also be used to treat other foods and food products that are vulnerable to microbial contamination. These include fruits and vegetables, including those processed and packaged for consumption, as well as dairy products, such as cheese. The compositions can be applied to such fruits and vegetables, as well as dairy products, by dipping or spraying. In some embodiments, the compositions can be added to water used during process transport or sprayed mechanically during hard surface treatments.

The compositions and methods disclosed herein are useful for reducing microbial contamination of food products, particularly microbial contamination related to foodborne pathogens, for example *Salmonella* spp., including *Salmonella typhimurium*, *Salmonella enteritidis*, *Salmonella enterica*, including its subspecies and serotypes, *Salmonella bongori*, *Campylobacter* species such as *Campylobacter jejuni* and *Campylobacter coli*, *Listeria monocytogenes*, *Escherichia coli*, particularly strains such as O157:H7 and other shigatoxin producing *E. coli*, *Shigella species*, *Clostridium perfringens*, *Staphylococcus aureus*, *Vibrio cholera*, *Yersinia enterocolitica*, as well as contamination resulting from yeasts, molds, parasites, and viruses, for example, Norovirus.

In general, a reduction of microbial contamination can be assayed by determining the level of viable microbes on the surface of the treated food product. In some embodiments, a reduction of microbial contamination can be a reduction of about 50%, about 80% about 90%, about 95%, about 99% or about 99.9% of the contamination of the treated food product compared to an untreated control food product. Alternatively, or in addition, the reduction can be specified as a $Log_{10}$ reduction. Thus in some embodiments a reduction of microbial contamination can be a 1, 2, 3, 4, 5, 6, or 7 Log reduction relative to an untreated control sample. Levels of microbial contamination can be determined, for example, by standard cultural methods involving microbial outgrowth, nucleic acid amplification techniques such as polymerase chain reaction, and immunoassays.

EXAMPLES

Example 1: Materials and Methods

Solutions of organic acids and carbonic acid salts were prepared by dissolving the appropriate weight of the dry components in water to obtain the desired concentration and pH. Peracetic acid (PAA) solutions were prepared by diluting 15% VigorOx® (PeroxyChem LLC) with deionized water to obtain the target concentration of PAA.

The oxidizers were added to the prepared antimicrobial composition and then amount of active oxygen was confirmed by titration on an autotitrator and by using Chemetrics test kits K-7913F and K-5543.

Example 2

Organic acids were added to plastic containers containing 5.0 L of tap water at 4° C. The alkaline modifiers, NaOH, $Na_2CO_3$, $Na_2CO_3 \cdot 1.5H_2O_2$, $Na_3PO_4$, were added to the solution in the plastic container in an amount sufficient to bring pH to about 7-9 depending upon the pKa of the organic acid. Then, 5 pieces of chicken breast weighing about 200 gram each were added to each container. The solution was then incubated for one hour at 4° C., with periodic stirring. The pH was measured immediately before the addition of the poultry and then after the 1 hour incubation at 4° C. The results of this experiment are shown in Table 1.

TABLE 1

Effect of pH of tap water containing acids and alkaline modifiers

| Acid | Acid concentration, ppm | Alkaline modifier | pH initial | pH after 1 hour |
|---|---|---|---|---|
| None | 0 | none | 7.3 | 6.5 |
| Glycolic | 500 | none | 3.6 | 4.5 |
| Glycolic | 250 | NaOH | 9.0 | 7.5 |
| Glycolic | 250 | $Na_2CO_3$ | 6.7 | 6.8 |
| Citric | 2,500 | $Na_2CO_3 \cdot 1.5H_2O_2$ | 7.5 | 7.5 |
| Citric | 5,000 | $Na_2CO_3 \cdot 1.5H_2O_2$ | 8.5 | 8.5 |
| Acetic/Peracetic | 10 | none | 6.2 | 6.5 |
| Acetic/Peracetic | 30 | none | 5.2 | 5.5 |
| Acetic/Peracetic | 10 | NaOH | 9.4 | 7.5 |
| Acetic/Peracetic | 45 | $Na_3PO_4$ | 8.7 | 7.6 |
| Acetic/Peracetic | 10 | $Na_2CO_3$ | 8.4 | 7.9 |
| Acetic/Peracetic | 10 | $Na_2CO_3 \cdot 1.5H_2O_2$ | 7.9 | 7.4 |

As shown in Table 1, samples containing organic acids in the absence of an alkaline modifier were relatively acidic. The addition of an alkaline modifier increased the pH relative to samples that did not contain an alkaline modifier. The pH of all the samples decreased over time in contact with the poultry. The magnitude of the decrease varied. The ability of the alkaline modifier to stabilize the pH also varied. The pH of samples containing sodium hydroxide, with its low buffering capacity, decreased from over 9.0 to about 7.5. In contrast, the pH of samples containing sodium carbonate ($Na_2CO_3$) or sodium percarbonate ($Na_2CO_3 \cdot 1.5H_2O_2$) remained relatively stable.

Example 3

This experiment was performed with peracetic acid as described in Example 1. The pH was adjusted with alkaline modifiers in an amount sufficient to bring pH into a range of 7-9. The concentration of active oxygen resulting from either peracetic acid (PAA) or hydrogen peroxide was measured immediately after preparation and then after 1 hour at 4° C. as described in Example 1. The results of this experiment are shown in Table 2.

TABLE 2

Concentration of PAA and $H_2O_2$ in the presence of alkaline modifiers.

| Additive | Additive concentration ppm | PAA, ppm Initial | PAA, ppm in 1 hour | $H_2O_2$, ppm Initial | $H_2O_2$, ppm in 1 hour |
|---|---|---|---|---|---|
| none | 0 | 25 | 24 | 11 | 11 |
| NaOH | 100 | 25 | 8 | 11 | 4 |
| $NaHCO_3$ | 275 | 25 | 23 | 11 | 11 |
| $NaHCO_3$ | 125 | 10.4 | 8.5 | 6.5 | 6.3 |
| $NaHCO_3$ | 250 | 30.3 | 29.6 | 19.9 | 18.9 |
| $Na_2SiO_3$ | 200 | 25 | 8.0 | 11 | 7 |
| $Na_5P_3O_{10}$ | 125 | 10.4 | 4.0 | 6.5 | 1.4 |
| $Na_5P_3O_{10}$ | 125 | 30.1 | 8.6 | 20.1 | 4.8 |

As shown in Table 2, the effect of alkaline modifiers on PAA and hydrogen peroxide stability varied. Sodium hydroxide, sodium silicate, and sodium tripolyphosphate promoted a relatively rapid decrease in the concentration of both PAA and hydrogen peroxide. In contrast, concentrations of both PAA and hydrogen peroxide remained relatively stable in the presence of sodium bicarbonate.

Example 4

The effect of organic acids and alkaline modifiers on microbial viability was assayed using a *Salmonella* suspension testing method as described below.

Inoculum Preparation.

*Salmonella enterica* ATCC 14028 was grown in trypticase soy broth for approximately 24 hours. A 1:5 dilution of organism was prepared in Butterfield's buffer. This dilution was added in equal parts to sterile fetal bovine serum in order to produce a working inoculum containing a 50% organic load. Dilution of the working inoculum into the test matrix at a 1:10 ratio, resulted in a 5% organic load.

Test Solutions.

The acid solutions tested were prepared in deionized water in % w/w. pH was adjusted as needed to reach the targets of 7.5 or 8.5 by manual addition of sodium hydroxide, sodium carbonate, sodium bicarbonate or sodium percarbonate.

Test Method.

After pH adjustment, 9 mL aliquots of the test solutions were added to a sterile centrifuge tube using sterile disposable serological pipettes. Then, a 1 mL aliquot of working inoculum was added to the test solution and vortexed briefly to mix. A 1 mL aliquot was removed from the mixture at 1, 30, and 60 minutes following inoculation, and immediately added to a 9 mL volume of Letheen neutralizing broth. This broth was then vortex mixed, diluted serially into Butterfield's buffer, and the dilutions plated on 3M™ Petrifilm™ Aerobic Count Plates. The plates were incubated for 24-48 hours at 35° C., and then counted manually. Log 10 calculations were performed to obtain the Log 10 CFU/mL of the solutions at each time point. The results of this experiment are shown in Table 3.

TABLE 3

Average $Log_{10}$ Reduction; 60 min treatment

| Acid | Acid concentration | Alkaline modifier | pH | $Log_{10}$ reduction |
|---|---|---|---|---|
| Citric | 0.5% | none | 2.4 | 3.83 |
| Citric | 0.5% | $Na_2CO_3 \cdot 1.5H_2O_2$ | 7.5 | 7.09 |

TABLE 3-continued

Average $Log_{10}$ Reduction; 60 min treatment

| Acid | Acid concentration | Alkaline modifier | pH | $Log_{10}$ reduction |
|---|---|---|---|---|
| Lactic | 0.5% | none | 2.6 | 5.25 |
| Lactic | 0.5% | $Na_2CO_3 \cdot 1.5H_2O_2$ | 7.5 | 7.07 |
| Propionic | 0.5% | none | 3.1 | 2.15 |
| Propionic | 0.5% | $Na_2CO_3 \cdot 1.5H_2O_2$ | 7.5 | 7.07 |
| Peracetic/acetic | 12 ppm | NaOH | 8.5 | 0.29 |
| Peracetic/acetic | 12 ppm | $Na_2CO_3$ | 8.5 | 3.52 |
| Peracetic/acetic | 12 ppm | $NaHCO_3$ | 7.5 | 3.75 |
| Peracetic/acetic | 12 ppm | $Na_2CO_3$ | 7.5 | 6.50 |

As shown in Table 3, addition of percarbonate to the organic acids (citric, lactic, and propionic acid) resulted in a virtually complete kill of *Salmonella* despite the relatively high pH of the solutions. The addition of carbonic acid salts resulted in a relatively higher antimicrobial efficacy than did the addition of sodium hydroxide.

Example 5

Poultry pieces (breasts) about 200-300 gram each were weighed (Wi), then incubated in test solutions containing peracetic acid at 10 ppm and either sodium hydroxide (NaOH) sodium carbonate ($Na_2CO_3$), sodium percarbonate ($Na_2CO_3 \cdot 1.5H_2O_2$), or sodium bicarbonate ($NaHCO_3$) at 4° C. for 3 hours. Three poultry pieces were used for each test condition. The solutions were stirred every 15 minutes. Temperature and pH were measured and adjusted every 30 minutes in order to maintain the initial pH.

After 3 hours, the poultry samples were removed from the solutions and shaken 10 times to remove water. The surface water was further removed by blotting the samples with tissue paper. The weight after soaking ($W_S$) was determined and the poultry pieces were drip dried for 2 hours at room temperature. The final weight was measured ($W_f$). The change in the weight after soaking ($\Delta W_S$) and the change in the weight after drip drying ($\Delta W_f$) were calculated as below.

$$\Delta W_S (\text{Soak}) = (W_S - W) / W \times 100\%$$

$$\Delta W_f = (W_f - W) / W \times 100\%$$

Where:
W=initial weight
$W_S$=weight immediately after soaking
$W_f$=weight after drip dry time.

Taken together, the change in the weight after soaking ($\Delta W_S$) and the change in the weight after drip drying ($\Delta W_f$) reflected the water holding capacity (WHC) of the samples.

The results of this experiment are shown in Table 4. Each data point is an average of 3 measurements.

TABLE 4

WHC of chicken breasts in Peracetic Acid Solution

| PAA Concentration, ppm | Alkaline modifier | pH | $\Delta W_S$, % | $\Delta W_f$, % |
|---|---|---|---|---|
| 0 | none | 7.6 | 4.42 | 1.04 |
| 10 | none | 6.5 | 3.69 | 0.89 |
| 10 | NaOH | 9.0 | 3.45 | 0.96 |
| 10 | $Na_2CO_3$ | 9.5 | 4.92 | 2.01 |

TABLE 4-continued

WHC of chicken breasts in Peracetic Acid Solution

| PAA Concentration, ppm | Alkaline modifier | pH | $\Delta W_S$, % | $\Delta W_f$, % |
|---|---|---|---|---|
| 10 | $Na_2CO_3 \cdot 1.5H_2O_2$ | 8.8 | 4.57 | 1.76 |
| 10 | $NaHCO_3$ | 7.5 | 4.76 | 1.65 |

As shown in Table 4, poultry soaked in PAA in the absence of alkaline modifier had the lowest weight gain. Increasing the pH by the addition of sodium hydroxide did not result in an increase in the weight of the poultry after either soaking or in the final weight. In contrast, increasing the pH by the addition of carbonic acid salts resulted in an increase in the weight of the poultry both after soaking and in the final weight.

Example 6

Commercially available chicken carcasses (average weight 3.5 pounds) were tagged with a zip tie and labeled with a number for identification. The carcasses were drained of any residual fluid from the packing box by hanging upside down from the drumstick tag for 60 to 90 seconds. Each carcass was then weighed to determine pre-treatment weight. A total of 20 carcasses was used for this experiment.

Three gallons of test solution containing PAA (Spectrum™) was prepared in a 5 gallon bucket using cold tap water. The pH of two of these solutions was adjusted with either sodium phosphate or sodium bicarbonate. The control solution contained tap water, with no added PAA. Another control solution contained PAA that was unadjusted for pH. After the solutions were prepared, they were cooled to a temperature of a 40° F., which was then maintained during the test.

Each treatment group of 5 carcasses was placed into the 5 gallon containers containing 3 gallons of the PAA solutions described above. The solution was mixed gently every 10 minutes. After 1 hour at 40° F., the carcasses were removed from the PAA solution, hung upside down, and allowed to drip dry for 90 seconds. After the carcasses were drip dried, they were weighed to determine a post-treatment weight ($W_f$). Moisture gain was calculated as:

$\Delta W_f = (W_f - W)/W \times 100\%$.

The results of this experiment are shown in Table 5.

TABLE 5

Moisture gain at different pH

| PAA Concentration | Alkaline modifier | pH | Moisture Gain, % |
|---|---|---|---|
| 0 | none | 6.5 | 1.7 |
| 60 | none | 4.3 | 2.3 |
| 60 | $NaHCO_3$ | 6.6 | 2.9 |
| 45 | none | 4.9 | 1.4 |
| 45 | $Na_3PO_4$ | 8.7 | 2.4 |

As shown in Table 6, the combination of peracetic acid and sodium bicarbonate at pH 6.6 resulted in the largest moisture gain.

Example 7

For offal treatments, mixtures of organic acids and peroxyacids were prepared by weighing the components and dissolving them in water to reach the desired concentration. Peracetic acid (PAA) solutions were prepared by diluting VigorOx® (PeroxyChem LLC) with tap water to obtain the target concentration.

The pH of the aseptic compositions was adjusted using a 25% aqueous solution of NaOH, solid sodium carbonate, or sodium bicarbonate. The amount of active oxygen was confirmed by titration on an autotitrator and by using Chemetrics test kits K-7913F and K-5543.

Fresh poultry livers and gizzards, and lamb livers and kidneys were purchased untreated and fresh (not frozen) from local suppliers. All offal was kept refrigerated before testing.

Example 8

Poultry offal was collected into a single large plastic bag. A gloved hand was used to remove either 6 whole, bi-lobed livers or 12 gizzards and place them in 350 mL of either water, an 840 ppm PAA solution, or an 840 ppm PAA solution that had been adjusted to a pH of 10.2 with sodium hydroxide and used within 5 minutes of pH adjustment. The samples were incubated in the solutions for 8-10 seconds. After treatment, a freshly gloved hand was used to remove 2 livers (or 4 gizzards) into a small plastic strainer. The treated samples were allowed to drain for 30 to 60 seconds to remove excess moisture. Each set of 2 livers (or 4 gizzards) was then placed into 100 mL peptone buffer and rinsed in the peptone for 30 seconds. A few milliliters of rinsate were removed by transfer pipette and kept on ice for dilution and plating. The plates were incubated for 24 to 48 hours at 35° C. and counted manually to determine the Aerobic Plate Count (APC) and the Enterobacteriaceae count (EBC). The color of the treated samples was noted by visual inspection. The results of this experiment are shown in Table 6.

TABLE 6

Microbial load of rinses from treated poultry offal samples

| Offal Type | Treatment | pH | Log APC | Log EBC | Color |
|---|---|---|---|---|---|
| Gizzards | Control | n/a | 2.97 | 1.08 | natural |
| Gizzards | Water | 7.0 | 2.89 | 1.00 | natural |
| Gizzards | PAA | 3.4 | 0.70 | 0.00 | bleached |
| Gizzards | PAA | 10.2 | 0.85 | 0.00 | natural |
| Livers | Control | n/a | 1.53 | 0.30 | natural |
| Livers | Water | 7.0 | 1.43 | 0.00 | natural |
| Livers | PAA | 3.4 | 0.00 | 0.00 | bleached |
| Livers | PAA | 10.2 | 0.30 | 0.00 | natural |

As shown in Table 6, treatment of offal with peracetic acid for a short time (8-10 seconds) resulted in microbial reduction. This effect was observed at both high and low pH. However, livers were bleached as a result of treatment with peracetic acid at low pH. In contrast, the natural color of the livers and gizzards was retained following treatment with peracetic acid solutions at high pH.

Example 9

Organoleptic observations were also performed on offal samples treated with increasing concentrations of peracetic acid. Lamb and chicken livers were treated with peracetic acid solutions at concentrations of 100 ppm, 200 ppm, 400 ppm, and 800 ppm that had been pH adjusted with an NaOH solution to a pH of 10.3. In parallel, lamb and chicken livers were treated with peracetic acid solutions at concentrations of 100 ppm, 200 ppm, 400 ppm, and 800 ppm that had not been pH adjusted. The pH of the unadjusted solutions was in the range of 3.6-4.8. Treatment with the unadjusted, low pH peracetic acid solutions substantially altered the appearance of the lamb and chicken livers. In contrast, the appearance of the lamb and chicken livers in the high pH solutions was practically unchanged.

At concentrations above 400 ppm of peracetic acid foaming was noted in both pH adjusted and unadjusted solutions. The foaming may reflect decomposition of the hydrogen peroxide present in the peracetic acid solutions by catalase enzymes in the livers.

Organoleptic effects were not observed for kidneys and gizzards. No color change was noted upon treatment of kidneys and gizzards even in peracetic acid solutions at low pH.

Example 10

Six chicken livers were added to 500 mL of peracetic acid solution, and incubated room temperature for 5, 15, or 30 seconds. Then the livers were removed and quickly added individually to 100 mL Buffered Peptone Water in a sterile cup, 1 liver per cup. Cups were manually shaken for 30 seconds and the liquid was sampled for plating. Sample rinses were serially diluted using Butterfield's buffer and plated on Aerobic Plate Count (APC) and *Escherichia coli* Coliform (ECC) plates. The plates were incubated for 24-48 hours at a temperature of 35° C., and then counted manually. $Log_{10}$ calculations were performed to obtain the $Log_{10}$ CFU/mL of the solutions at each time point. The results of this experiment are shown in Table 7.

TABLE 7

Average $log_{10}$ microbial reduction after PAA treatment of chicken livers

| PAA, ppm | Alkaline modifier | pH | Treatment time, seconds | APC $log_{10}$ reduction | ECC $log_{10}$ reduction |
|---|---|---|---|---|---|
| 1000 | none | 3.1 | 5 | 0.9 | 0.5 |
| 1000 | none | 3.1 | 15 | 1.2 | 1.1 |
| 1000 | NaOH | 7.5 | 5 | 1.1 | 0.8 |
| 1000 | NaHCO$_3$ | 7.5 | 15 | 1.1 | 3.1 |
| 1000 | NaHCO$_3$ | 7.5 | 30 | 1.7 | 3.1 |
| 1000 | Na$_2$CO$_3$ | 8.5 | 5 | 1.1 | 1.1 |

As shown in Table 7, short-term contact with peracetic acid solutions in decreased the microbial population on the liver surface. The decrease was noted for both pH adjusted and pH unadjusted peracetic acid solutions. The magnitude of the decrease was greatest for peracetic acid solutions that had been pH adjusted with sodium bicarbonate.

Example 11

Lamb livers were treated with peracetic acid solutions for 10 minutes in the presence of citric or lactic acids. The peracetic acid solutions were pH adjusted with sodium carbonate. The effect on the microbial population was analyzed as described in Example 9. The results of this experiment are shown in Table 8.

TABLE 8

Average $log_{10}$ reduction after PAA treatment of lamb livers

| PAA, ppm | Additive | pH | Treatment time, minutes | APC log10 reduction |
|---|---|---|---|---|
| 0 | none | 7.6 | 10 | 0.0 |
| 100 | none | 4.1 | 10 | 2.2 |
| 100 | none | 7.5 | 10 | 3.0 |
| 100 | Citric acid, 2% | 7.5 | 10 | 1.8 |
| 100 | Lactic acid, 2% | 7.5 | 10 | 1.8 |

As shown in Table 8, contact with peracetic acid solutions even at concentrations as low as 100 ppm decreased the microbial population on the lamb liver surface. The magnitude of the decrease was greatest for peracetic acid solutions that had been pH adjusted with sodium carbonate.

Example 12

Peracetic acid solutions at concentrations of 100 ppm or 500 ppm peracetic acid were pH adjusted using solid sodium carbonate.

Three lamb livers were used for each test condition. Lamb livers were weighed (W), then placed in the peracetic acid solutions solutions and incubated at 22° C. The solutions were stirred every 15 min. After 1 hour, the livers were removed from the solutions and shaken gently to remove water. The remaining surface water was removed by blotting with tissue paper. The treated lamb livers were then weighed to determine a post treatment weight. (weight after soaking, $W_S$).

After that, the livers were allowed to drip dry for 1 hour at room temperature. The drip dried livers were then reweighed to determine the final weight ($W_f$). Water holding capacity (WHC) was calculated as follows:

$$\Delta W_S(\text{Soak})=(W_S-W)/W \times 100\%$$

$$\text{WHC}=\Delta W_f=(W_f-W)/W \times 100\%$$

The results of this experiment are shown in Table 9. The calculated WHC results are shown for lamb livers. Each data point was an average of 3 measurements.

TABLE 9

Water holding capacity of lamb livers treated with PAA solutions

| PAA Concentration, ppm | pH | $\Delta W_S$, % | $\Delta W_f$, % |
|---|---|---|---|
| 0 | 7.6 | 10.0 | 6.2 |
| 100 | 4.1 | 6.7 | 2.2 |
| 100 | 7.5 | 8.5 | 7.4 |
| 100 | 8.5 | 9.1 | 4.7 |
| 500 | 3.3 | 6.4 | 0.4 |
| 500 | 7.5 | 6.7 | 3.1 |
| 500 | 8.5 | 7.9 | 4.0 |

As shown in Table 9, treatment of lamb livers with peracetic acid solutions at low pH with no pH adjustment resulted in the lowest weight gain. Treatment of lamb livers with peracetic acid solutions that had been pH adjusted to 7.5 resulted in the highest weight gain.

What is claimed is:

1. A method for reducing microbial contamination of a food product selected from the group consisting of: an animal carcass, poultry, meat, and seafood, comprising:

contacting the food product with an aqueous composition comprising either sodium carbonate and peracetic acid, or sodium bicarbonate and peracetic acid, wherein the ratio of sodium carbonate or sodium bicarbonate to peracetic acid is sufficient to maintain a pH above 6.5, and wherein contact between said aqueous composition and said food product is maintained for a time sufficient to increase the water holding capacity of the food product while reducing the level of microorganisms by at least 50%.

2. The method of claim 1, wherein the increase in the water holding capacity is evidenced by a heavier weight in the food product after soaking in said aqueous composition compared to soaking in water alone.

3. The method of claim 1, wherein said aqueous composition further comprises an organic acid selected from the group consisting of: lactic acid, benzoic acid, salicylic acid, glycolic acid, citric acid, oxalic acid, propionic acid, formic acid, sorbic acid, malic, maleic, tartaric, ascorbic, and fumaric acid.

4. The method of claim 1, wherein the food product is any bird or fowl used for human or animal consumption or egg production.

5. The method of claim 4, wherein the food product is selected from the group consisting of chicken, duck, turkey, goose, ostrich, pheasant, quail, and squabs.

6. The method of claim 1, wherein the food product is meat from any animal used for human or animal consumption.

7. The method of claim 6, wherein the food product is selected from the group consisting of: beef, pork, veal, and buffalo.

8. The method of claim 1, wherein the food product is fish or shellfish.

9. The method of claim 1, wherein the concentration of the sodium carbonate or sodium bicarbonate is from about 10 ppm to about 20,000 ppm.

10. The method of claim 1, wherein the concentration of PAA is from about 1 ppm to about 10,000 ppm and the pH is 7-10 during the process of contacting the food product with the aqueous composition.

11. The method of claim 1, wherein the concentration of PAA is from about 1 ppm to about 500 ppm.

12. The method of claim 1, wherein the composition consists of an aqueous solution of:
   a) sodium carbonate, peracetic acid and the equilibrium products formed by said sodium carbonate and peracetic acid dissolved in water; and/or
   b) sodium bicarbonate, peracetic acid and the equilibrium products formed by said sodium bicarbonate and peracetic acid dissolved in water;
   c) an organic acid selected from the group consisting of: lactic acid, benzoic acid, salicylic acid, glycolic acid, citric acid, oxalic acid, propionic acid, formic acid, sorbic acid, malic, maleic, tartaric, ascorbic, and fumaric acid.

13. The method of claim 12, wherein the concentration of PAA is from about 1 ppm to about 10,000 ppm and the pH is 7.5-10 during the process of contacting the food product with the aqueous composition.

14. The method of claim 1, wherein the only organic acids in the composition are formed by the dissolution of peracetic acid, sodium carbonate and/or sodium bicarbonate in water.

15. The method of claim 14, wherein the food product is any bird or fowl used for human or animal consumption or egg production.

16. The method of claim 15, wherein the food product is selected from the group consisting of chicken, duck, turkey, goose, ostrich, pheasant, quail, and squabs.

17. The method of claim 14, wherein the food product is meat from any animal used for human or animal consumption.

18. The method of claim 17, wherein the food product is selected from the group consisting of: beef, pork, veal, and buffalo.

19. The method of claim 14, wherein the food product is fish or shellfish.

20. The method of claim 14, wherein the aqueous composition is applied by spraying, dipping or soaking in a chiller tank at a temperature of 4° C. or lower.

21. The method of claim 14, wherein the concentration of the sodium carbonate or sodium bicarbonate is from about 10 ppm to about 20,000 ppm.

22. The method of claim 14, wherein the concentration of peracetic acid is from about 1 ppm to about 10,000 ppm and the pH is 7-10 during the process of contacting the food product with the aqueous composition.

23. The method of claim 14, wherein the concentration of PAA is from about 1 ppm to about 500 ppm.

24. The method of claim 14, wherein the composition consists of an aqueous solution of:
   a) sodium carbonate, peracetic acid and the equilibrium products formed by said sodium carbonate and peracetic acid dissolved in water; and/or
   b) sodium bicarbonate, peracetic acid and the equilibrium products formed by said sodium bicarbonate and peracetic acid dissolved in water.

25. The method of claim 1, wherein microbial contamination is reduced at a temperature of 4° C. or lower.

26. The method of claim 25, wherein microbial contamination is reduced in a chiller tank.

* * * * *